Jan. 4, 1927.  
B. M. W. HANSON  
1,613,350  
FEED MECHANISM FOR TOOLS  
Filed Oct. 11, 1922  2 Sheets-Sheet 1

Inventor  
Bengt M. W. Hanson  
by  
W. Clay Lindsey  
His Attorney

Inventor
Bengt M. W. Hanson
By
His Attorney

Patented Jan. 4, 1927.

1,613,350

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

FEED MECHANISM FOR TOOLS.

Application filed October 11, 1922. Serial No. 593,701.

The aim of the invention is to provide means having features of novelty and advantage for feeding a tool relative to the work upon which it is to operate. My invention finds particular adaptation in connection with feeding the work spindles of drill presses and like machinery, and, therefore, for purpose of exemplification it is here illustrated and described with reference to its use in a drill press.

More particularly, my invention contemplates a very simple and easily operated feed mechanism by means of which the drill spindle may be manually moved to bring the drill, for instance, up to the desired point and then (upon discontinuance of manual operation and without requiring any further action on the part of the operator) the power driven means automatically comes into play to feed the tool at the desired speed and to the proper depth into the work; the depth to which the drill is fed being controlled, at will, either manually or automatically, and the drill being then automatically returned to inoperative position.

In the accompanying drawings, wherein I have shown for illustrative purposes one embodiment which the invention may take, Fig. 1 is a side view of the drill press embodying my invention, parts being in vertical section;

Figure 1:
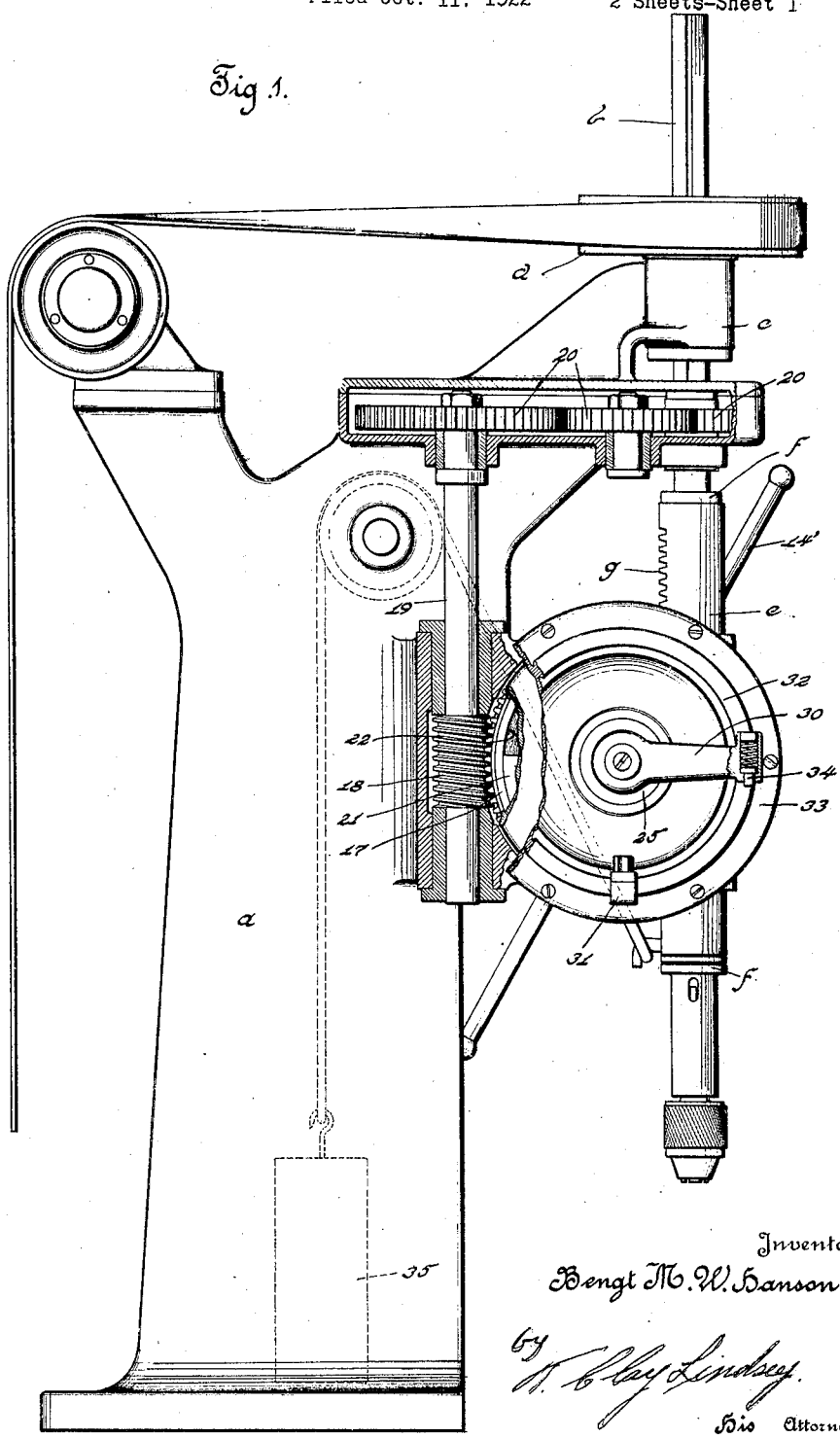

Referring to the drawings in detail, $a$ denotes the frame of any suitable construction, and $b$ a vertically reciprocable tool spindle slidably and rotatably mounted in a bearing $c$ provided in the overhanging arm of the frame $a$. The tool spindle is rotated, as usual, through a pulley $d$ splined on the spindle. $e$ is the ordinary sleeve rotatably receiving the spindle $b$ but fixed against longitudinal movement relative thereto as by means of collars $f$. This sleeve has the usual rack $g$. The several parts just described are such as are ordinarily employed in machines of this kind.

Figure 2:
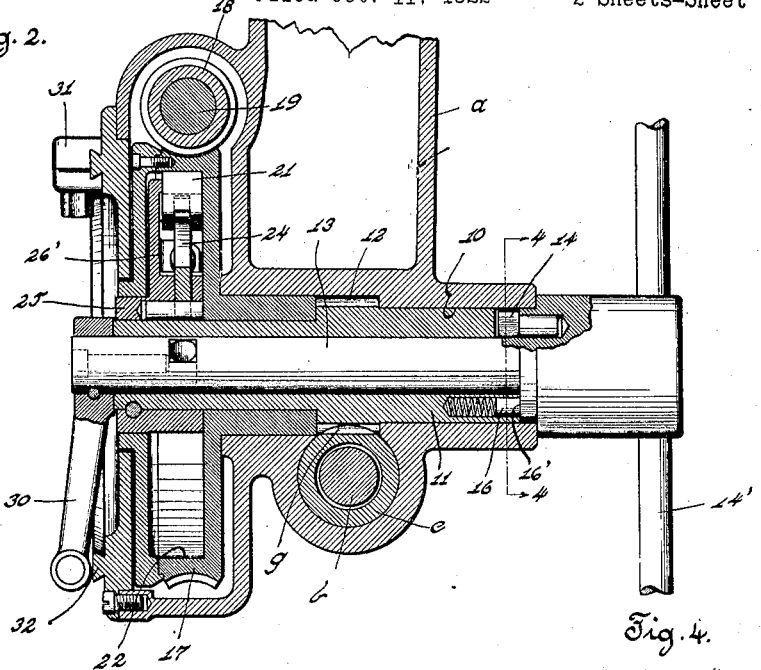
Fig. 2 is a horizontal sectional view through the feeding mechanism, this view being taken substantially on line 2—2 of Fig. 3.
Figure 4:
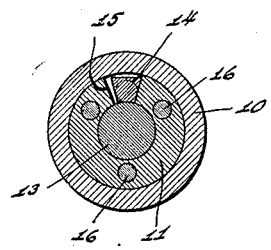
Fig. 4 is a transverse view taken substantially on line 4—4 of Fig. 2.
Figure 3:
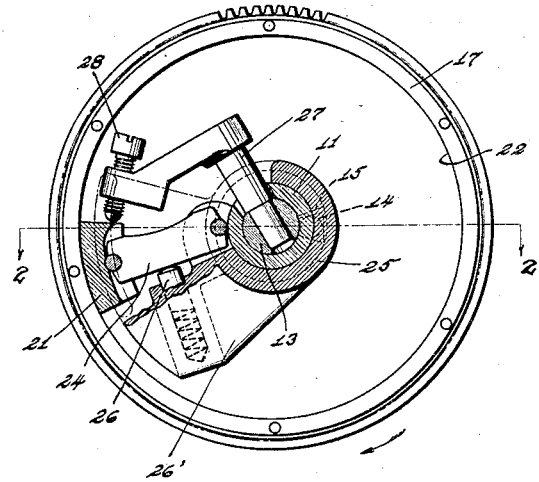
Fig. 3 is a detail view of the automatic clutch mechanism looking towards the left hand end of Fig. 2 with the housing cover and one side of the worm wheel removed to show the internal construction.

Journalled in a horizontal bearing 10 provided in the frame $a$ is a hollow or pinion shaft 11 having pinion teeth 12 meshing with the teeth of the rack $g$. Extending axially through this pinion shaft is a shaft 13 having on its outer end a handle 14' by means of which the tool spindle is manually fed longitudinally. The shafts 11 and 13 are keyed together by a key 14 carried by the head of the shaft 13 and positioned in a key-way 15 in the shaft 11. From Fig. 4, it will be seen that the key-way is slightly greater than the key 14 so that the shafts 11 and 13 may have a slight rotary movement relative to one another for the purpose hereinafter described. For the purpose of frictionally holding the shafts 11 and 13 in any position of angular adjustment, there is provided in the shaft 11 spring pressed plungers 16 pressing against a shoulder 16' provided on the shaft 13. Journalled on the shaft 11 is a worm wheel 17 which is formed of two parts and is hollow as is shown most clearly in Fig. 2. This worm wheel is constantly driven in a single direction through the worm 18 connected up by shaft 19 and gears 20 to the work spindle $b$. The worm wheel 17 constitutes one clutch member of an overrunning or one-way clutch. The other clutch member is in the form of a shoe 21 adapted for driving engagement with the internal periphery 22 of the worm wheel and connected by a link 24 to a collar 25 fixed to the pinion shaft 11. The arrangement is such that, when the shaft 11 is rotated in the direction of the arrow (Fig. 3) faster than the worm wheel, the shoe 21 will not be in gripping relation with the clutch surface 22 of the worm wheel but when the worm wheel is rotated faster than the shaft 11, then the shoe 21 will be wedged against the internal periphery of the worm wheel resulting in the shaft 11 and the worm wheel being driven in unison. The toggle connection, including the shoe 21 and the link 24, is normally urged by a spring pressed plunger 26 in a direction to maintain the shoe in engagement with the worm wheel. This spring pressed plunger is carried by an arm 26' on the collar 25. Carried by the shaft 13 is a knock-off mechanism comprising an arm 27 having an adjustable screw 28 adapted to engage the shoe 21 to disconnect it from the worm wheel.

For the purpose of automatically limiting the extent to which the drill is fed into the work, there is provided on the end of the shaft 13 an arm 30 the free end of which is adapted to come into engagement with a stop 31 adjustable on an annular way 32 on the face of the casing cover 33. The free end of the arm carries a spring pressed pin 34 which is adapted to engage the stop 31 before the arm itself engages this stop.

The operation of my improved mechanism is substantially as follows: The work spindle is, of course, continuously driven through the pulley $d$, and the worm wheel is also continuously driven in a single direction through its described connection with the spindle $b$. To feed the drill down to the work, the handle 14 is rotated in the direction of the arrow (Fig. 1) at a greater speed than that at which the worm wheel is driven. When the handle 14 is thus turned, it will rotate, through the key and key-way connection 14, 15, the pinion shaft 11, in a direction to move the rack sleeve $e$ together with the spindle carried thereby down towards the work and during this time the shoe 21 will slide along the clutch surface 22 of the worm wheel. When the drill has been thus manually fed down to the work, the operator will either discontinue turning the handle 14, or, due to the resistance which the work offers to the tool, the manual feeding of the tool will be retarded, whereupon, without any further act on the part of the operator, the worm wheel will pick up the shoe 21 and drive the pinion 11 at such speed that the tool is fed into the work at the desired rate. If it is desired to automatically limit the extent to which the drill is fed into the work, the stop 31 will be so adjusted on its key-way that when a hole of the proper depth is drilled the arm 34 will engage this stop thereby causing the manually operated shaft 13 to turn in the shaft 11 the distance of the clearance, shown in Fig. 4, between the key 14 and the side face of the key-way 15. When this shaft is thus turned the knock-off mechanism is moved in such direction that the screw 28 thereof will disengage the shoe 21 from the clutch surface 22 of the worm wheel. The parts will be held in this position owing to the very substantial frictional engagement of the spring pressed plungers 16 against the shoulders 16'. The clutch now being disconnected, the drill spindle will be automatically raised to inoperative position as by means, for instance, of a weight 35 carried by the rope 36, one end of which is fixed to the sleeve $e$. The purpose of the spring pressed pin 34 is to cause the arm 30 to rebound after this arm strikes the stop 31 and thereby insures that the knock-off mechanism sharply disengages and entirely removes the shoe 21 from the worm wheel. The operator may disconnect the clutch and thereby stop feeding of the drill at any point by slightly turning the handle 14 in a counter-clockwise direction, thereby causing the knock-off mechanism to disengage the shoe 21 from the worm wheel.

It will be seen that in the construction described the pinion shaft 11 is common to the manually operated means, namely, the handle 14 for feeding the spindle and to the power driven means acting through the clutch. When manual feeding of the drill spindle is discontinued, the clutch is self acting in that it automatically comes into play without any action on the part of the operator, a feature which is of importance and advantage. The construction is very simple in its arrangement, and may be economically manufactured; it may be very easily manipulated and controlled, and is extremely sturdy being able to withstand rough and long usage.

What I claim is:—

1. In a drill press or like machine, a tool spindle adapted for longitudinal movement, means for manually feeding the same, power driven means, a self-acting clutch for automatically connecting said power driven means to said spindle when the rate of manual feed thereon falls below a predetermined speed and at any point in the operative stroke of the spindle irrespective of the position of the work and means connected to said first mentioned means for controlling the engagement of said clutch.

2. In a drill press or like machine, a tool spindle adapted for longitudinal movement, means including a handle for manually feeding said tool, power driven means, a clutch between said power driven means and spindle including a pair of members one continuously driven and the other connected to said manual feeding means, said clutch members being automatically engaged when the speed at which the second mentioned clutch member is manually rotated falls below that at which the first mentioned clutch member is driven and at any point in the operative stroke of the spindle irrespective of the position of the work and means connected to said handle for throwing and maintaining said clutch in disengaged condition.

3. In a drill press or like machine, a tool spindle adapted for longitudinal movement, a shaft for longitudinally moving the same, a handle operatively connected to said shaft for rotating it and thereby manually feed said spindle, power driven means, a clutch between said power driven means and shaft including a constantly driven clutch member and a friction shoe, and a link pivotally connecting said shoe to said shaft, said link and shoe forming a toggle.

4. In a drill press or like machine, a tool spindle adapted for longitudinal movement, means for manually feeding the same, power driven means, self-acting means connecting said power driven means to said spindle when the rate of manual feed thereof falls below a predetermined speed at any point in the operative stroke of the spindle irrespective of the position of the work, a device operatively connected to said first mentioned means for engaging and disengaging said self-acting means, means for automatically operating said device to disconnect said self-acting means to stop feed of the tool spindle in any desired longitudinal position, and means for returning the tool spindle to inoperative position.

5. In a drill press or like machine, a tool spindle adapted for longitudinal movement, a shaft connected thereto for longitudinally moving the same, a manually operable shaft within and having limited angular movement relative to said first shaft, power driven means, a clutch between said power driven means and first shaft, and means carried by said manually operable shaft for disconnecting said clutch when the manually operable shaft is turned relative to said first-mentioned shaft.

6. In a drill press or like machine, a tool spindle adapted for longitudinal movement, a shaft connected thereto for longitudinally moving the same, a manually operable shaft within and having limited angular movement relative to said first shaft, power driven means, a clutch between said power driven means and first shaft including a constantly driven clutch member, and a second clutch member connected to said first shaft for wedged engagement with said first clutch member, an arm on said manually operable shaft adapted to disengage said clutch when said manually operable shaft is turned relative to the first shaft for disconnecting said clutch, and means for opposing relative movement between said first shaft and manually operable shaft.

7. In a drill press or like machine, a tool spindle adapted for longitudinal movement, a shaft connected thereto for longitudinally moving the same, a manually operable shaft within and having limited angular movement relative to said first shaft, power driven means, a clutch between said power driven means and first shaft including a constantly driven clutch member, and a second clutch member connected to said first shaft for wedged engagement with said first clutch member, an arm carried by said manually operable shaft and provided with an adjustable screw, said screw being brought into engagement with said second mentioned clutch member for disconnecting the clutch when the manually operable shaft is turned relative to said first shaft, and frictional means for opposing angular movement between said first shaft and manually operable shaft.

8. In a drill press or like machine, a tool spindle adapted for longitudinal movement, a shaft connected thereto for longitudinally moving the same, a manually operable shaft having limited angular movement relative to said first shaft, power driven means, a clutch between said power driven means and first shaft, means actuated by relative movement between said manually operable shaft and first shaft for disconnecting said clutch, and adjustable means for automatically turning said shafts one relative to the other to disconnect said clutch.

9. In a drill press or like machine, a tool spindle adapted for longitudinal movement, a shaft connected thereto for longitudinally moving the same, a manually operable shaft having limited angular movement relative to said first shaft, power driven means, a clutch between said power driven means and first shaft, means carried by said manually operable shaft for disconnecting said clutch when said manually operable shaft is turned relative to said first shaft, an adjustable stop, and means on said manually operable shaft adapted to engage said stop to thereby turn said manually operable shaft relative to said first shaft and stop feeding of the spindle.

10. In a drill press or like machine, a tool spindle adapted for longitudinal movement, a shaft connected thereto for longitudinally moving the same, a manually operable shaft having limited angular movement relative to said first shaft, power driven means, a clutch between said power driven means and first shaft, means carried by said manually operable shaft for disconnecting said clutch when said manually operable shaft is turned relative to said first shaft, an adjustable stop, and means on said manually operable shaft adapted to engage said stop to thereby turn said manually operable shaft relative to said first shaft and stop feeding of the spindle, said last mentioned means including a spring actuated device for insuring sufficient turning movement between said shafts to disengage said clutch.

11. In a drill press or like machine, a tool spindle adapted for longitudinal movement, a shaft connected thereto for longitudinally moving the same, a manually operable shaft having limited angular movement relative to said first shaft, spring actuated means carried by said first shaft and having frictional engagement with said manually operable shaft whereby to oppose relative angular movement between said shafts, power driven means, a clutch between said power driven means and first shaft, means carried by said manually operable shaft and adapted to disconnect said clutch when said manually operable shaft is turned relative to said first mentioned shaft, and means for turning said manually operable shaft relative to said first mentioned shaft to cause said last mentioned means to disconnect the clutch.

12. In a drill press or like machine, a tool spindle, a shaft connected thereto for longitudinally moving the same, a manually operable shaft having limited angular movement relative to said first shaft, means for opposing said movement, power driven means, a clutch between said power driven means and shaft including a constantly driven clutch member and a clutch member carried by said first shaft and adapted for automatic engagement with said first clutch member; and means carried by said manually operable shaft for engaging and disconnecting said second mentioned clutch member when the manually operable shaft is turned in the proper direction relative to said first mentioned shaft.

13. In a drill press or like machine, a tool spindle, a shaft connected thereto for longitudinally moving the same, a manually operable shaft having limited angular movement relative to said first shaft, frictional means for opposing said movement, power driven means, a clutch between said power driven means and shaft including a constantly driven clutch member and a clutch member connected to said first shaft by a toggle link and adapted for automatic engagement with said first clutch member; an arm carried by said manually operable shaft, an adjustable screw on said arm for engaging and disconnecting said second mentioned clutch member when the manually operable shaft is turned in the proper direction relative to said first mentioned shaft, an adjustable fixed stop, and a second arm on said manually operable shaft adapted to engage said stop for automatically turning said manually operable shaft relative to said first shaft to cause said screw to disconnect said clutch members and thereby stop the feed of said spindle, said second arm having a spring pressed plunger adapted to engage said stop and thereby cause said screw to move said second clutch member entirely out of engagement with said first clutch member.

14. In a drill press or like machine, a tool spindle adapted for longitudinal movement, means for manually feeding the same, power driven means, a clutch including a driving member and a driven member arranged to automatically connect said power driven means to said spindle when the rate of manual feed thereon falls below a predetermined speed, and means connected to said first mentioned means for controlling the engagement of said clutch parts.

15. In a drill press or like machine, a tool spindle adapted for longitudinal movement, means including a handle for manually feeding said spindle, power driven means, a clutch for automatically connecting said power driven means to said spindle when the rate of manual feed thereon falls below a predetermined speed, means normally urging said clutch into engagement, and a device connected to said handle and arranged to disengage said clutch when said handle is rotated in a direction opposite to that in which it is rotated when feeding the spindle.

16. In a drill press or like machine, a tool spindle adapted for longitudinal movement, means including a handle for manually feeding said spindle, power driven means, a clutch for automatically connecting said power driven means to said spindle when the rate of manual feed thereon falls below a predetermined speed, means normally urging said clutch into engagement, a device connected to said handle and arranged to disengage said clutch when said handle is rotated in a direction opposite to that in which it is rotated when feeding the spindle, and a stop for moving said device in a direction to disengage said clutch to stop the feed of the tool spindle in any predetermined position.

17. In a drill press or like machine, a tool spindle adapted for longitudinal movement, a shaft connected thereto for longitudinally moving the same, a manually operable element having limited movement relative to said shaft and adapted to manually rotate the same, power driven means, a clutch between said power driven means and shaft, and means operatively connected to said element for disconnecting said clutch when said element is turned in one direction relative to said shaft, said clutch being engaged when said element is moved in the opposite direction relative to said shaft.

BENGT M. W. HANSON.